United States Patent [19]

Kamei

[11] Patent Number: 5,330,025
[45] Date of Patent: Jul. 19, 1994

[54] SUSPENSION CONTROL SYSTEM

[75] Inventor: Sadaaki Kamei, Hyogo, Japan

[73] Assignee: Mitsubishi Denki Kabushiki Kaisha, Tokyo, Japan

[21] Appl. No.: 9,223

[22] Filed: Jan. 26, 1993

[30] Foreign Application Priority Data

Jan. 29, 1992 [JP] Japan .................................. 4-13713

[51] Int. Cl.⁵ ........................................... B60G 17/15
[52] U.S. Cl. ................... 180/170; 180/177; 180/178; 280/707
[58] Field of Search ............... 280/703, 707; 180/177, 180/178, 179, 175, 170

[56] References Cited

U.S. PATENT DOCUMENTS

| | | | |
|---|---|---|---|
| 4,826,205 | 5/1989 | Konda et al. | 280/703 |
| 5,101,355 | 3/1992 | Wade et al. | |
| 5,159,554 | 10/1992 | Bama et al. | 280/703 |
| 5,163,705 | 11/1992 | Campbell et al. | 280/707 |
| 5,186,487 | 2/1993 | Wood et al. | 280/703 |

FOREIGN PATENT DOCUMENTS 63-63401 12/1988 Japan.
43328 1/1992 Japan.

Primary Examiner—Richard M. Camby
Attorney, Agent, or Firm—Sughrue, Mion, Zinn, Macpeak & Seas

[57] ABSTRACT

In a suspension control system, a constant speed travel control device controls throttle control unit according to information from a control switch unit and a vehicle speed sensor, to control the vehicle speed, and, when necessary, applies an over-drive off signal to an automatic speed changer, and a suspension control device detects acceleration of the vehicle from the outputs of the vehicle speed sensor and a throttle opening sensor, to calculate a most suitable damping force of a suspension, and receives control state data through a transmission line from the constant speed travel control device, to determine a most suitable damping force to control damping force switching unit. Thereby, comfortableness in the driving vehicle is improved.

4 Claims, 4 Drawing Sheets

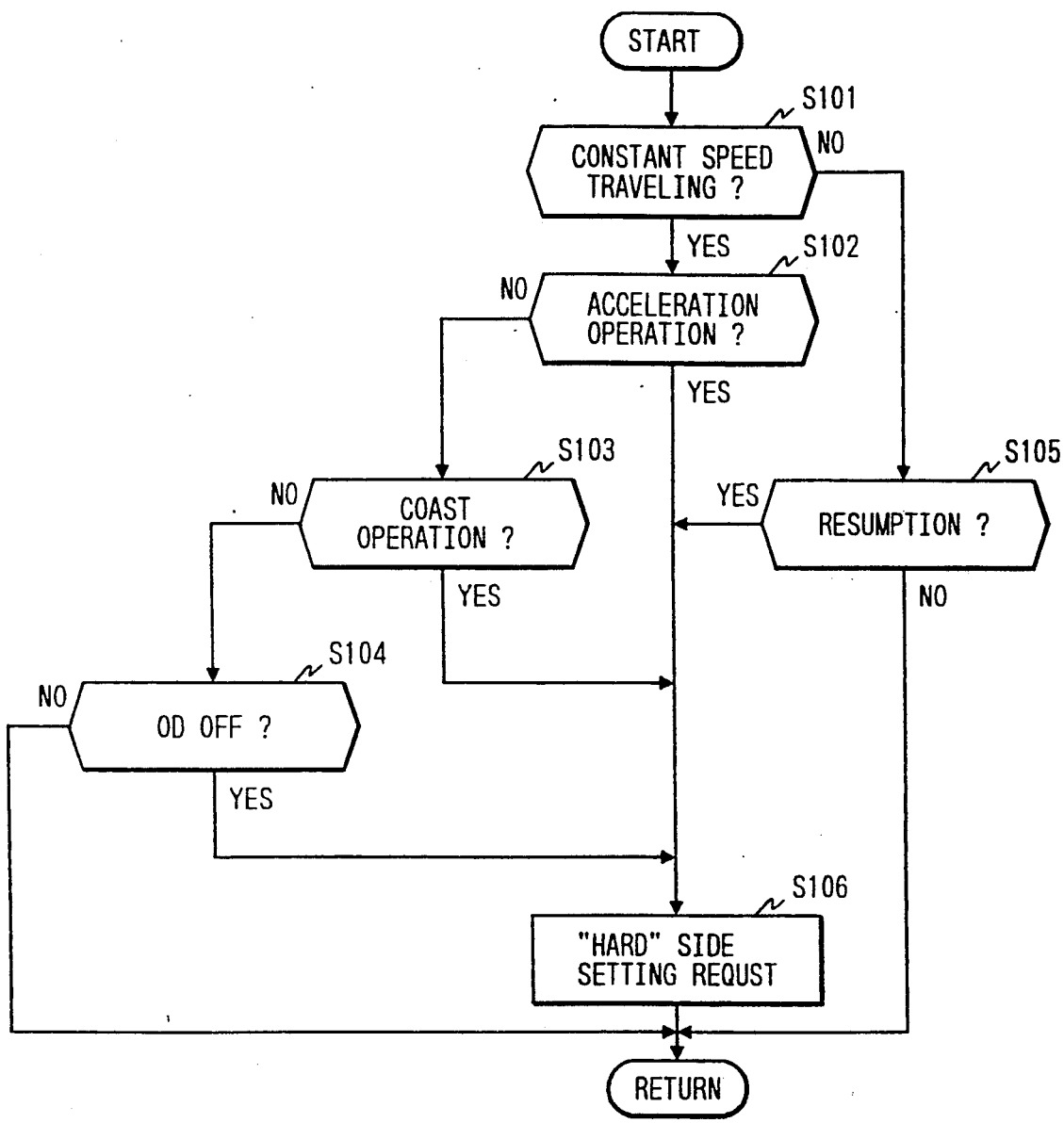

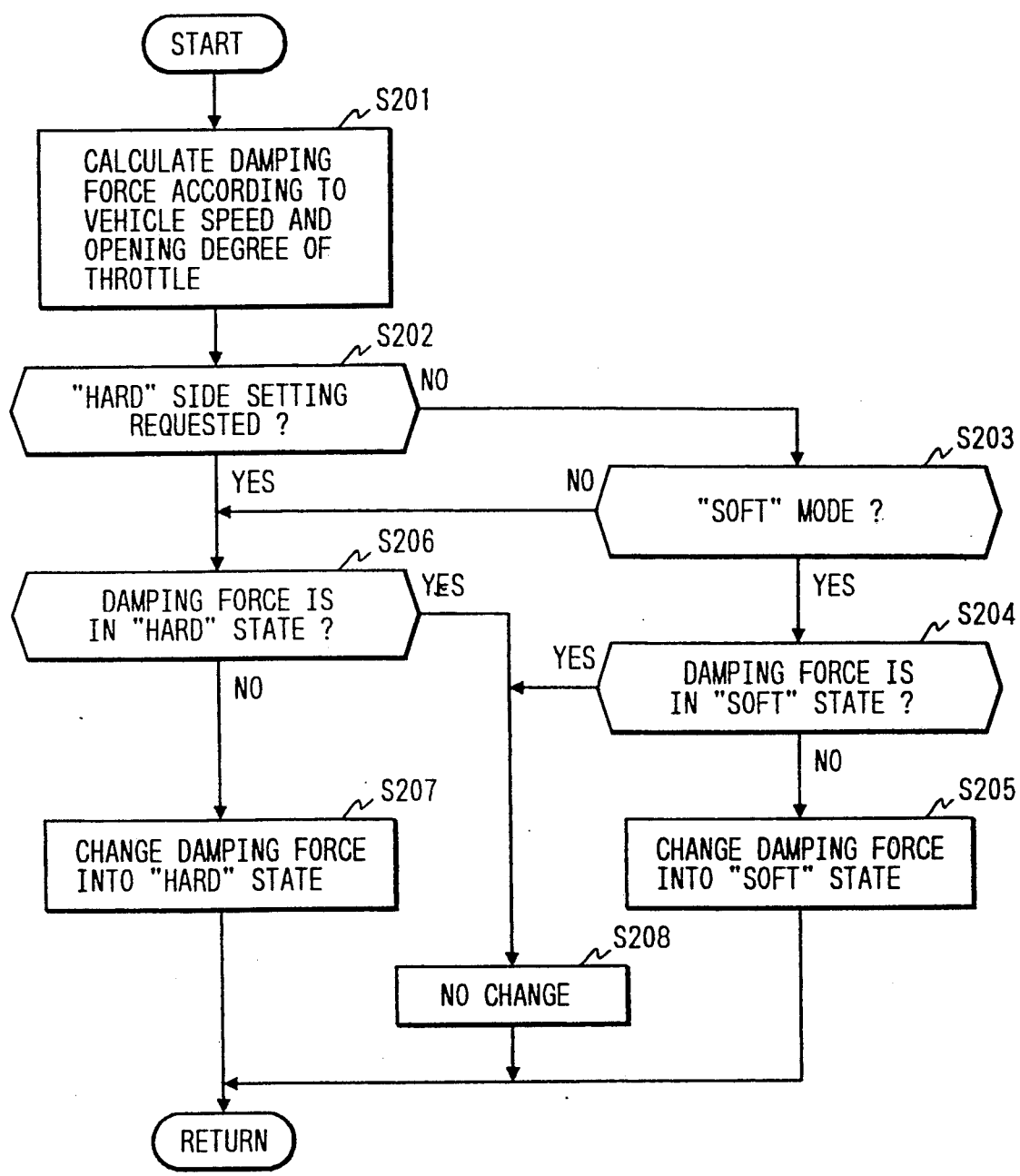

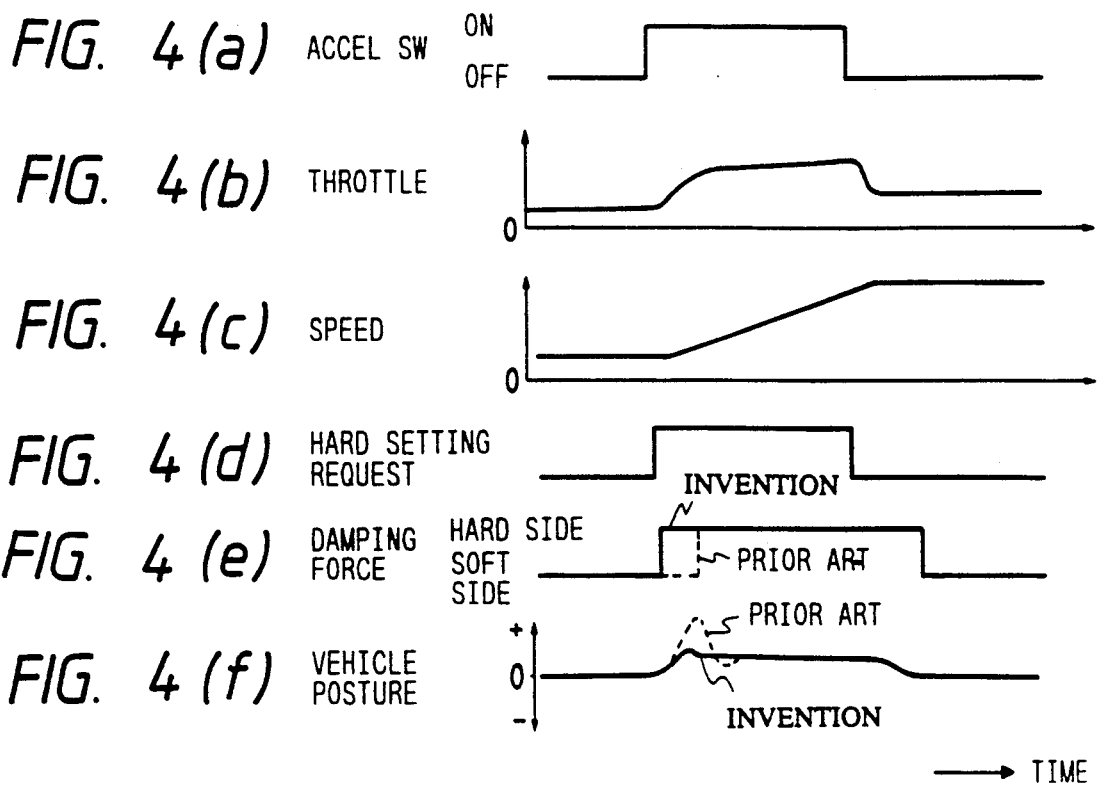
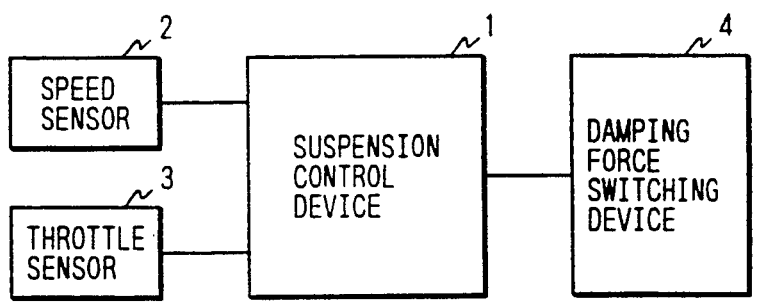

SUSPENSION CONTROL SYSTEM

BACKGROUND OF THE INVENTION

This invention relates to a suspension control system which controls the damping force of a suspension of a vehicle according to travel conditions of the vehicle.

FIG. 5 is a block diagram showing a conventional suspension control system. In FIG. 5, reference numeral 1 designates a suspension control device for controlling the damping force of a suspension; 2, a vehicle speed sensor for measuring a travel speed of a vehicle; 3, a throttle opening sensor for measuring a degree of opening of a throttle valve; and 4, damping force switching means 4 for changing the damping force of the suspension. The vehicle speed sensor 2, the throttle opening sensor 3, and the damping force switching means 4 are connected to the suspension control device 1.

The conventional suspension control system shown in FIG. 5 operates as follows: The suspension control device 1 calculates the acceleration of the vehicle by using a vehicle speed outputted by the vehicle speed sensor 2 and a degree of opening detected by the throttle opening sensor 3. When the acceleration thus calculated is higher than a predetermined value, the suspension control device 1 performs control to increase the damping force of the suspension; that is, it applies a switching instruction to the damping force switching means 4 to increase the damping force of the suspension to minimize variations in posture of the vehicle, thereby to improve the comfortableness in driving the vehicle.

The conventional suspension control device is designed as described above. That is, after the occurrence of acceleration has been detected from variations in the degree of opening of the throttle valve or in vehicle speed, the damping force of the suspension is changed. Hence, it is impossible for the device to prevent the posture of vehicle from changing at the beginning of acceleration or deceleration.

During constant speed travel of the vehicle in which it is essential for the driver to be able to comfortably drive the latter, great variations in posture of the vehicle should be sufficiently suppressed.

SUMMARY OF THE INVENTION

An object of this invention is to eliminate the above-described difficulties accompanying a conventional suspension control system. More specifically, an object of the invention is to provide a suspension control system which acts to keep the posture of the vehicle stable during constant speed travel.

The foregoing object of this invention is achieved by the provision of a suspension control system which, according to the invention, comprises: suspension control means for switching the damping force characteristics of a suspension according to control state data received through a transmission line from a constant speed travel control device.

The suspension control means receives the control state data through the transmission line from the constant speed travel control device, and anticipate the occurrence of acceleration of the vehicle from the control state data thus received, to control the damping force of the suspension, thereby to stabilize the posture of the vehicle with high efficiency which is traveling at constant speed.

BRIEF DESCRIPTION OF THE DRAWINGS

FIG. 2 is a flow chart for a description of control state monitoring operations in the system of the invention.

FIG. 3 is a flow chart for a description of suspension control operations in the system of the invention.

FIGS. 4(a)–4(f) are time charts showing the control operations of the system of the invention wherein FIG. 4(a) corresponds to the actuation of an acceleration switch, 4(b) corresponds to the throttle response, FIG. 4(c) corresponds to the vehicle speed response, FIG. 4(d) shows the setting of a head damping setting request and FIGS. 4(e) and 4(f) show the damping force and vehicle posture for both the conventional system and the system of the present invention, respectively.

FIG. 5 is a block diagram showing the arrangement of a conventional suspension control system.

DETAILED DESCRIPTION OF THE PREFERRED EMBODIMENT

Figure 1:
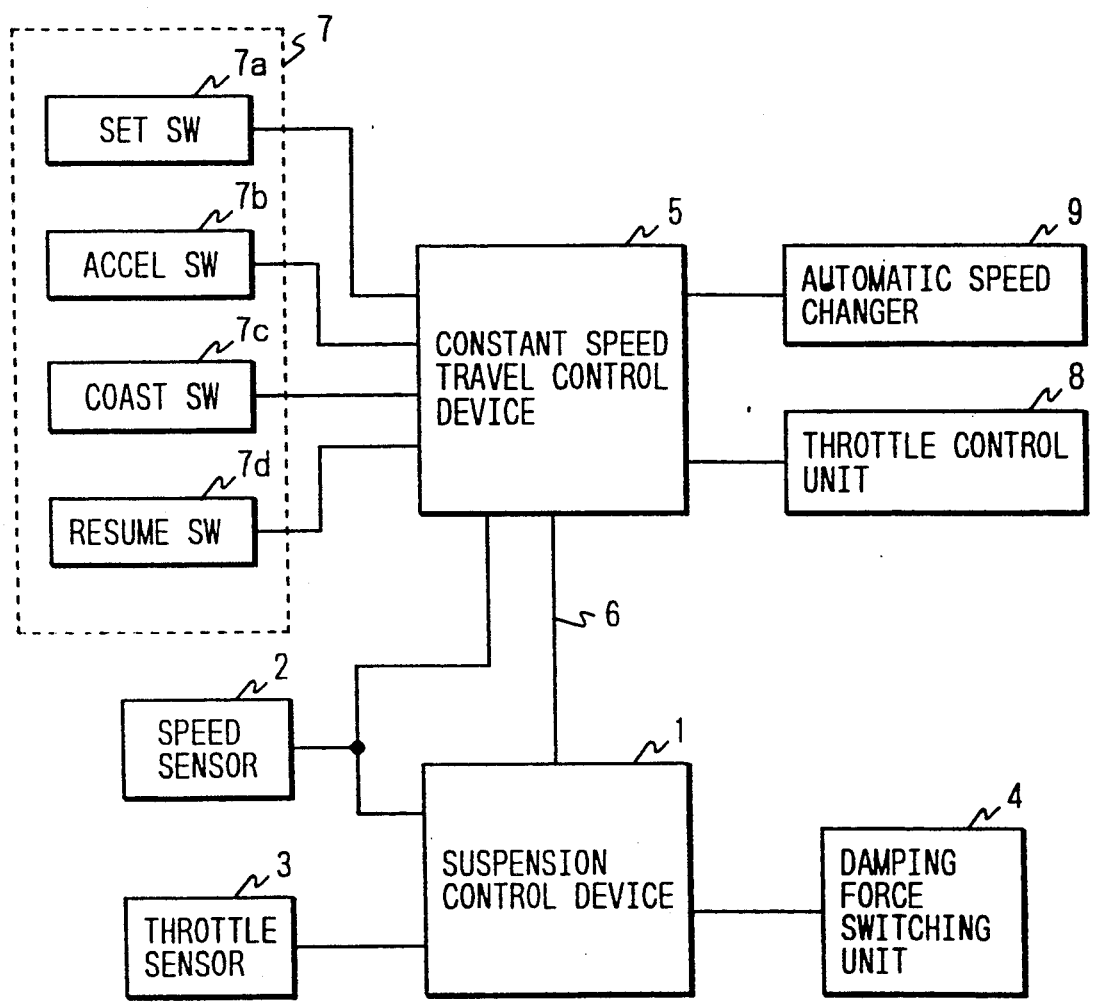
FIG. 1 is a block diagram showing the arrangement of a suspension control system, which constitutes one embodiment of this invention.

A suspension control system, which constitutes an embodiment of this invention, will be described with reference to the accompanying drawings. FIG. 1 is a block diagram showing the arrangement of the suspension control system. In FIG. 1, parts corresponding functionally to those which have been described with reference to FIG. 5 (the prior art) are therefore designated by the same reference numerals or characters.

In FIG. 1, reference numeral 1 designates suspension control means for controlling the damping force of a suspension, namely, a suspension control device; 2, a vehicle speed sensor for measuring travel speeds of a vehicle; 3, a throttle opening sensor for measuring degrees of opening of a throttle valve; 4, a damping force switching means for changing the damping force of a suspension; and 5, a constant speed travel control device having a throttle control function and an OD off (over-drive off) control function.

The constant speed travel control device 5 is connected through a transmission line 6 to the suspension control device 1. The transmission line 6 is used to transmit control state data from the constant speed travel control device 5 to the suspension control device 1, and to transmit data from the latter 1 to the former 5. That is, the transmission line 6 is of two-way transmission type.

The constant speed travel control device 5 is connected to a control switch unit 7 which is used to control the constant speed travel control device 5. The control switch unit 7 comprises: a set switch 7a for constant speed travel; an acceleration switch 7b for acceleration; a coast switch 7c for deceleration; and a resume switch 7d for restoring the vehicle speed to a stored value after the vehicle is released from constant speed travel.

Upon application of an instruction from the constant speed travel control device 5 to the throttle opening control unit 8, the latter 8 operates to adjust the degree of opening of the throttle valve, while the constant speed travel control device 5 applies an "OD off" instruction to an automatic speed changer 9. In response to the "OD off" instruction, the automatic speed changer 9 becomes ready for shifting down the speed change gear.

Now, the operation of the suspension control system thus organized will be described. The constant speed travel control device 5 controls the throttle control means 8 to control the travel speed of the vehicle according to the data provided by the control switch unit 7 and the vehicle speed sensor 2, and issues the "OD off" instruction to the automatic speed changer 9 when necessary.

The suspension control device 1 receives a vehicle speed from the vehicle speed sensor 2 and a degree of opening from the throttle opening sensor 3, to detect acceleration of the vehicle, and calculates a suitable suspension damping force according to the value of the acceleration thus detected.

The suspension control device 1 monitors the control state data of the constant speed travel control device 5 at all times which are applied thereto through the transmission line 6. When the control state data concern a great variation in acceleration of the vehicle; for instance when the acceleration switch 7b is turned on as indicated in the part (a) of FIG. 4, or when the "OD off" instruction is issued, the suspension control device 1 makes a "hard" side setting request for setting the suspension's damping force on the "hard" side (higher damping force side) as shown in the part (d) of FIG. 4.

As was described above, the suspension control device 1 determines a most suitable damping force according to the damping force calculated from the data provided by the vehicle speed sensor 2 and the throttle opening sensor 3, and to the "hard" side setting request made on the control state data of the constant speed travel control device, and applies a switching instruction to the damping force switching unit 4. In response to the switching instruction, the damping force switching unit 4 changes the suspension's damping force.

FIGS. 2 and 3 are flow charts showing the above-described operations of the suspension control system. In the flow chart of FIG. 2, the control state data provided by the constant speed travel control device 5 are monitored, and when necessary the "hard" side setting request is made. In Steps S101 through S105, the control states are subjected to decision, and in Step S106 the "hard" side setting request is made for setting the suspension's damping force on the "hard" side. This will be described in more detail.

In Step S101, the suspension control device 1 determines it from the control state data transmitted through the transmission line 6 from the constant speed travel control device 5 whether or not the vehicle is in constant speed travel. When it is determined that the vehicle is in constant speed travel, Step S102 is effected. In Step S102, it is determined whether or not an accelerating operation is being carried out with the acceleration switch 7b turned on as shown in the part (a) of FIG. 4. When it is determined that the accelerating operation is being carried out, then Step S106 is effected.

On the other hand, when in Step S101 it is determined that the vehicle is not in constant speed travel, Step S105 is effected. In Step 105, it is determined whether or not the vehicle speed is in resumption. When it is determined that the vehicle speed is not in resumption, then the control is returned. When it is determined that the vehicle speed is in resumption, then Step S106 is effected.

When in Step S102 it is determined that the accelerating operation is not being carried out, then Step S103 is effected. When in Step 103 it is determined that a coasting operation is being carried out, then Step S106 is effected. When in Step 103 it is determined that the coasting operation is not being carried out, then Step S104 is effected. When in Step S104 it is determined that the over-drive (OD) is off, then the control is returned. When the over-drive is not off, Step S106 is effected.

In Step S106, the "hard" side setting request is made as shown in the part (d) of FIG- 4.

FIG. 3 is a flow chart showing the control operations of the suspension control device 1. As shown in the flow chart of FIG. 3, in Step S201, a damping force (the part (e) of FIG. 4) is calculated according to a vehicle speed (the part (c) of FIG. 4) and a degree of opening of the throttle valve (the part (b) of FIG. 4). Thereafter, Step S202 is effected.

In Step S202, it is determined whether or not the "hard" side setting request has been made. When it is determined that the "hard" side setting request has been made, then Step S206 is effected. In Step S206, it is determined whether or not the present damping force is in "hard" state. When it is not in "hard" state, then S207 is effected. In Step S207, the damping force is placed in "hard" state.

When it is determined in Step S202 that no "hard" side setting request has been made, Step S203 is effected. In Step S203, it is determined whether or not a "soft" mode is effected. When it is determined that the "soft" mode is not effected, then Step S206 is performed. When it is determined that the "soft" mode is effected, then the operation is advanced to Step S204.

In Step S204, it is determined whether or not the present damping force is in "soft" state. When it is determined that it is in "soft" state, then Step S208 is effected. In Step S208, the present damping force is maintained as it is. When it is determined that it is not in "soft" state, then Step S205 is effected. In Step S205, the damping force is placed in "soft" state, and the control is returned.

If summarized, when, in the flow chart of FIG. 3, it is determined in Step S202 that the "hard" side setting request has been made, then Steps S206 and S207 or Steps 306 and S206 are effected; whereas when it is determined in Step S202 that no "hard" side setting request has been made, Steps S203 through S208 are effected according to the damping force calculated in Step 201. Thus, the posture of the vehicle in correspondence to the damping force is as indicated in the part (f) of FIG. 4. In the parts (e) and (f) of FIG. 4, the characteristics indicated by the broken lines are for the prior art, and those indicated by the solid lines are for the present invention.

As was described above, in the suspension control system of the invention, the transmission line is provided between the suspension control device and the constant speed travel control device, and the suspension control device expects acceleration of the vehicle from the control state data received through the transmission line from the constant speed travel control device, thereby to change the suspension's damping force. Hence, with the system of the invention, the variation in posture of the vehicle traveling at a constant speed is suppressed, and therefore the operator can more comfortably drive the vehicle.

What is claimed is:

1. A suspension control system comprising:
   constant speed travel control means for controlling a travel speed of a vehicle according to data input from a control switch means and a vehicle speed sensor and for issuing an over-drive off instruction to an automatic speed changer;

damping force switching means for changing a damping force of said suspension provided between a vehicle body and a wheel; and suspension control means or detecting acceleration of said vehicle from outputs provided by said vehicle speed sensor and a throttle opening sensor, and for calculating a first damping force of said suspension from said acceleration thus detected, said suspension control means receiving control state data from said constant speed travel control means and issuing a damping force increasing request when said control state data indicates a predetermined variation in acceleration of said vehicle, said suspension control means determining a damping force according to said first damping force and said damping force increasing request and applying a switching instruction to said damping force switching means, wherein said control switch means includes a cruise control set switch, an acceleration switch, a coast switch and a resume switch.

2. A suspension control system as claimed in claim 1, wherein said constant speed travel control means contorts throttle control means for operating a throttle valve.

3. A method for controlling a damping forth of a suspension of a vehicle, said method comprising steps of:

calculating a first damping force in response to an acceleration which is detected in accordance with a vehicle speed and an opening degree of a throttle valve;

monitoring control state data of a speed travel control device which automatically controls the driving speed of said vehicle;

issuing a damping force increasing request signal when said control state data indicates a predetermined variation in said acceleration of said vehicle;

determining a most suitable damping force according to said first damping force and said damping force increasing request signal; and applying a switching instruction to damping force switching means, wherein said monitoring step monitors whether one of an acceleration switch, coast switch and resume switch is activated and whether the vehicle is traveling at a constant speed and said issuing step issues said damping force increasing request signal when one of said switches is activated under a condition of constant speed travel.

4. The control system of claim 1, wherein said suspension control means applies said switch instruction when one of said acceleration, coast and resume switches is actuated during a condition of constant speed travel.

* * * * *